INVENTOR.
ADAM LENDER

Aug. 12, 1969     A. LENDER     3,461,426
ERROR DETECTION FOR MODIFIED DUOBINARY SYSTEMS
Filed April 20, 1966     3 Sheets-Sheet 2

INVENTOR.
ADAM LENDER
BY
Lippincott, Ralls & Hendrickson
ATTORNEYS

United States Patent Office 3,461,426
Patented Aug. 12, 1969

3,461,426
ERROR DETECTION FOR MODIFIED DUOBINARY SYSTEMS
Adam Lender, Palo Alto, Calif., assignor to Lenkurt Electric Co., Inc., San Carlos, Calif., a corporation of Delaware
Filed Apr. 20, 1966, Ser. No. 550,076
Int. Cl. G08c 25/00
U.S. Cl. 340—146.1                               6 Claims

ABSTRACT OF THE DISCLOSURE

An error detection method and system for modified duobinary data transmission in which correlation properties of the waveform are solely utilized without the introduction of redundant digits. Both the transmitted modified duobinary waveform and the binary waveform reconstituted therefrom by decoding are monitored and coincidences detected between extreme level signals of the former and correlated portions of the latter to indicate errors.

---

The present invention relates in general to detection of errors in modified duobinary data waveforms, and more particularly, to the detection of such errors without the introduction of redundant digits in the transmitted signals.

The present invention is particularly directed to the detection of errors in modified duobinary systems of the type disclosed and claimed in my co-pending patent application Ser. No. 528,484 for "Modified Duobinary Data Transmission," filed in the U.S. Patent Office on Feb. 18, 1966. Reference is made to the above-identified patent application for an explanation of the modified duobinary process and system, wherein there is produced a modified duobinary waveform having correlation properties in which the correlation span extends over three bits. Because of this longer correlation span, error detection is more effective in the modified doubinary system than in straight duobinary systems.

In general, the modified duobinary waveform operated upon by the present invention comprises a three-level signal in which the extreme levels represent one binary state, such as MARK, and a center or intermediate level signal represents the other binary state, such as SPACE. The original binary pulse train may be readily reconstructed from such a signal by the utilization of slicers, for example, wherein the extreme level signals are detected and employed to produce one binary signal level, and any signal level between these is employed to produce the other binary signal level. As a practical matter, reconstruction of the original binary pulse train may be accomplished either by detection of extreme level signals in the modified duobinary waveform or by the detection of signals having less than a predetermined variation from a center level. The modified duobinary signal follows a predetermined set of rules. These rules may be readily realized by grouping all of the successive MARKS in pairs and assigning the pair number of each MARK, as illustrated in FIGURE 4. Successive MARKS are indicated by the numerals 1 and 2, with a repetition of this numbering for the next pair of MARKS. A MARK bearing number 1 in a pair of two successive MARKS, will be seen to always have the opposite polarity relative to the previous MARK which, of course, carries the number 2. The polarity of the MARK identified by number 2, relative to the previous MARK bearing number 1, is governed by a set of odd and even rules, as in the straight duobinary system and method. More specifically, if the number of intervening spaces between a pair of MARKS numbered 1 and 2 is odd, then the polarities of these two MARKS are opposite. The correlation properties of the waveform Y permit the ready detection of errors.

There are herein provided method and means for the detection of errors when one of the extreme levels of the modified duobinary waveform has been reached, and after the occurrence of an error or plurality of errors. Error detection is herein accomplished from the data waveform itself, without the necessity of inserting any type of additional signals, i.e., no redundant digits are required. It will be appreciated that the prior art necessity of inserting particular error detection signals or digits reduces the available transmission rate for data and necessarily increases the complexity of equipment required. Consequently, the present invention provides a simplification of error detection which is highly advantageous insofar as data transmission is involved.

It is noted that the present invention provides for error detection, rather than error correction, and the present invention may be employed for retransmission of erroneous data blocks, monitoring the state of the transmission medium, or discarding erroneous received data. It is furthermore noted that errors in data transmission may arise from a variety of sources, such as noise interference, that changes from a MARK to a SPACE, or a SPACE to a MARK. Errors may occur singularly or in groups, and the present invention provides the detection of almost all errors, whether they be single digit errors or multiple digit errors. The present invention also automatically resets so as to continue monitoring the waveform in a proper manner after error detection.

The present invention is illustrated as to a single preferred embodiment thereof in the accompanying drawings, wherein.

Figure 1:
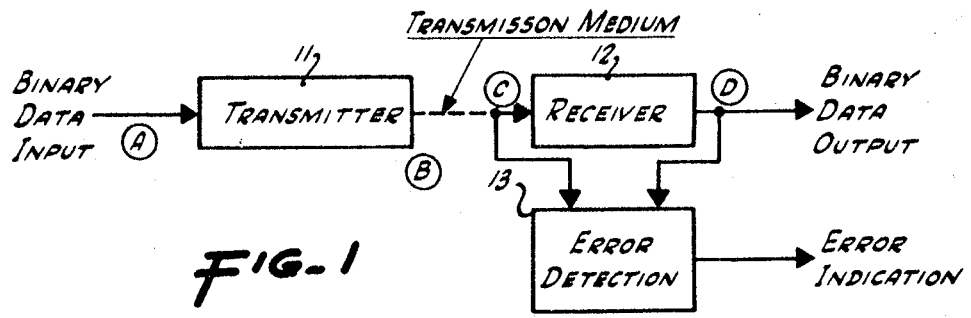
FIGURE 1 is a block diagram of a data transmission system including error detection in accordance with the present invention.

Referring now to the drawings, it will be seen that FIGURE 1 generally depicts a data transmission system including a transmitter 11 adapted to receive a binary data input in the form of a pulse train of MARK AND SPACE signal levels, and connected through any type of communication medium to a receiver 12. At this receiver the wave for encoded at the transmitter is decoded to be returned into the original binary data pulse train as an output for utilization. In accordance with the present invention, there is provided an error detection means 13, coupled to the receiver and producing an output error indication upon the occurrence of errors in the binary data output. This error detection is based upon the correlative properties of the transmitted data waveform, as described in more detail below. The error indication may be employed as desired to operate a counter, for example, as an indication of the percentage of errors transmitted, and, furthermore, to provide for an indication of error transmittal or automatic cancellation of data blocks including a predetermined number of errors, for example.

Figure 2:
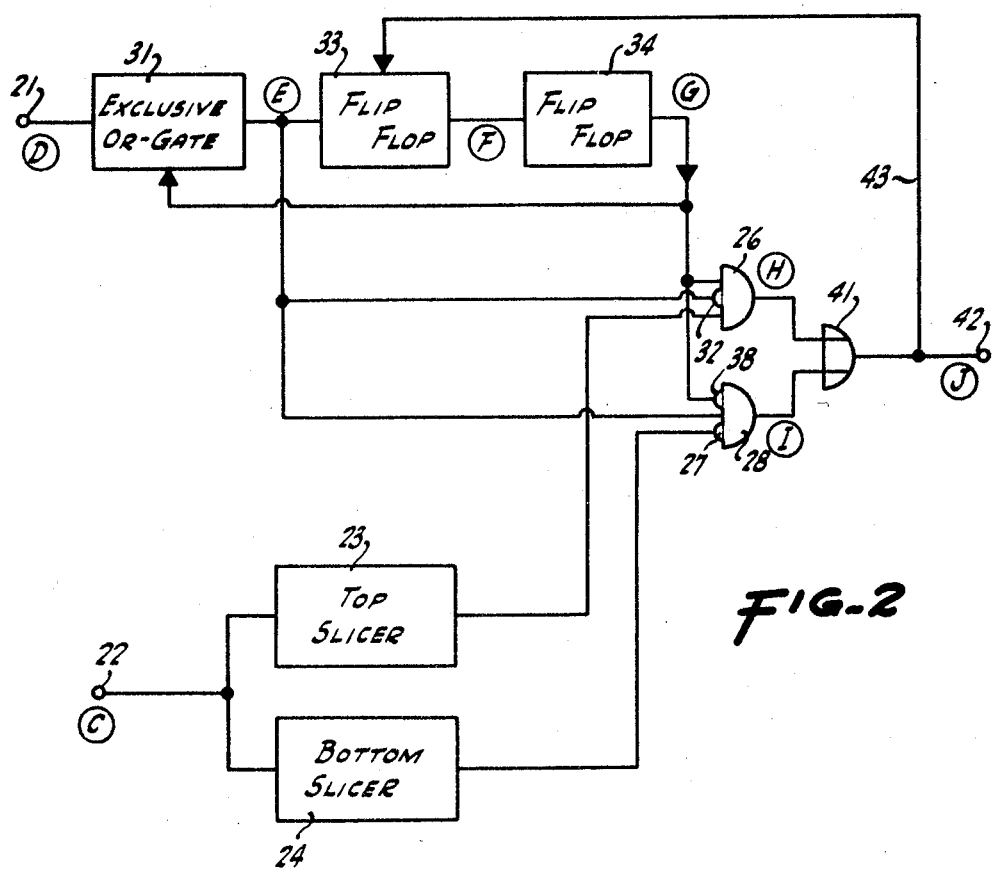
FIGURE 2 is a block diagram of a preferred embodiment of the present invention.

The error detection unit 13 of FIGURE 1 may be comprised of the circuit illustrated in FIGURE 2, as a preferred embodiment of the present invention. The operation of the circuit of FIGURE 2 may be best understood by simultaneous reference to the waveforms illustrated in FIGURE 3, and it is noted that the location of the existence of such waveforms is correlated between the figures by utilization in both figures of the same capital letters identifying the waveform. Thus, an input terminal 21 of FIGURE 2 is adapted to receive the binary data output D from the receiver 12, and this presumably comprises the binary data input illustrated at A of FIGURE 3. A second input terminal 22 of the circuit of FIGURE 2 is connected to the receiver 12 for receipt of the received waveform, C of FIGURE 3, before it is converted back into the binary data form. The terminal 22 is connected to a pair of slicer circuits 23 and 24, with the top slicer 23 indicating when the input waveform exceeds the predetermined amplitude of a positive polarity, and the bottom slicer 24 indicating when the input waveform exceeds a predetermined negative amplitude. The output of the top slicer 23 is applied as one input of an AND circuit 26, and the output of the bottom slicer 24 is applied through an inverter 27 to a second AND circuit 28, as described in more detail below.

The binary input terminal 21 of the circuit of FIGURE 2 is connected as one input of an EXCLUSIVE OR gate circuit 31, and the output of this circuit is connected as one input of the AND circuit 28 and through an inverter 32 as one input of the AND circuit 26. The output of this EXCLUSIVE OR gate circuit 31 is also applied to a first flip-flop circuit 33, having the output thereof connected to a second flip-flop circuit 34. The output of this second flip-flop circuit 34 is connected back as the other input of the EXCLUSIVE OR gate 31, and is additionally applied as one further input of the AND circuit 26 and through an inverter 38 as another input of the AND circuit 28. The outputs of the two AND circuits 26 and 28 are connected as inputs to an OR circuit 41, which has the output thereof connected to an output terminal 42 and also through a feedback line 43 to an input of the first flip-flop circuit 33.

Figure 3:
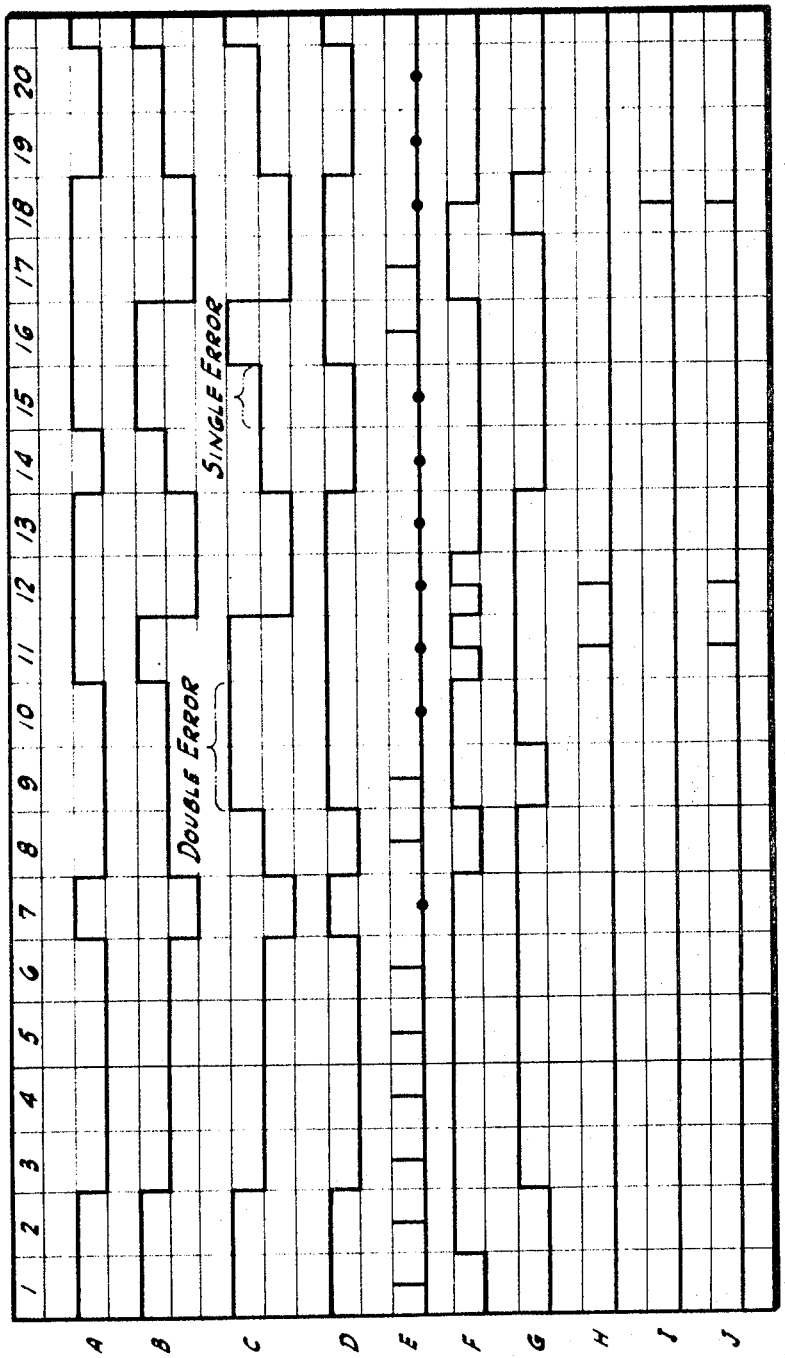
FIGURE 3 is an illustration of waveforms at identified portions of the present invention; and, FIGURE 4 is an illustration of a modified duobinary waveform as related to a straight binary waveform from which it is derived.
Figure 4:
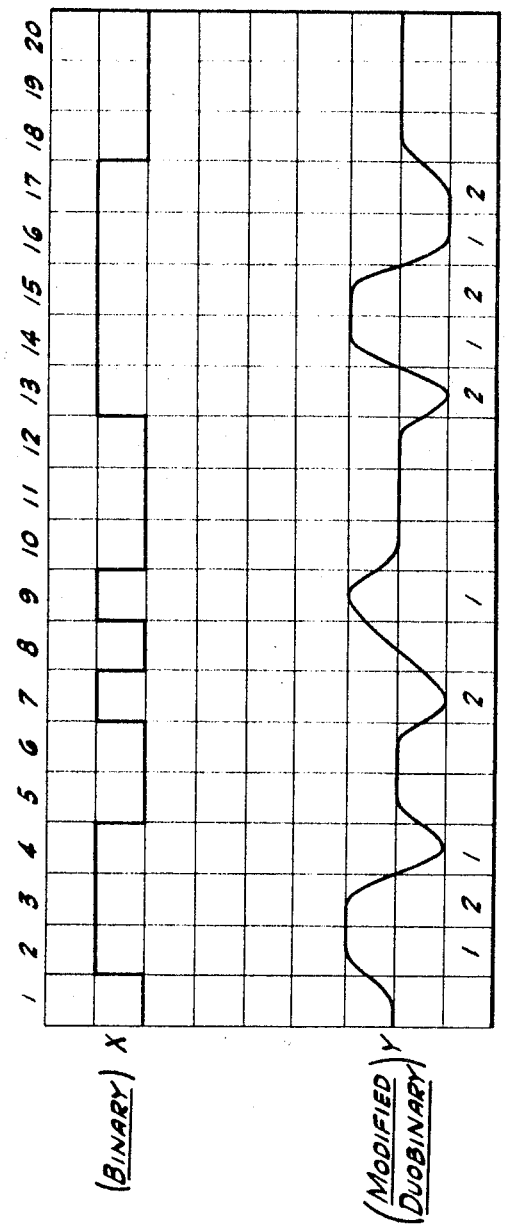

Operation of the above-described circuit of FIGURE 2 may be best understood from a consideration of waveforms at various portions of the circuitry, as illustrated in FIGURE 3. It will be seen from reference to FIGURE 3 that the showing thereof is divided into data bits 1 to 20, as numbered across the top of the figure, and the first waveform A illustrates a binary data pulse train as maybe applied to the input of transmitter 11 in FIGURE 1. It is the same binary pulse train A that is desired to be produced as an output of the receiver 12, after encoding in the transmitter, transmittal, reception and decoding in the receiver. The present invention operates to detect errors that may occur in the foregoing process, and does so without the introduction of additional signals or digits into the data pulse train.

Waveform B of FIGURE 3 represents the modified duobinary signals corresponding to the binary data pulse train A. Thus, waveform B is the correct modified duobinary signal pattern corresponding to the binary data of A. It is to be appreciated that this modified duobinary waveform is emitted from the transmitter in some carrier modulated form or base band, and in FIGURE 3, for simplicity and clarity, is shown only as rectangular pulses, rather than in actual waveform. Waveform C of FIGURE 3 illustrates the modified duobinary waveform B, but including both single and double errors as indicated in the figure. A comparison of the waveform B and C will indicate the errors present. Waveform C is also shown only as rectangular pulses, for simplicity.

Waveform C appears at input terminal 22 and this waveform, reconstituted into binary form, as illustrated at D, is applied to input terminal 21. It is to be noted that insofar as the modified duobinary signal is concerned, the extreme levels are herein considered to be MARK and the center level as SPACE. The waveform or pulse train D applied to terminal 21 is, in turn, applied to the EXCLUSIVE OR gate 31, along with the output of the two-stage shift register consisting of the flip-flop circuits 33 and 34. The output of the EXCLUSIVE OR gate comprises trigger pulses E, as indicated in FIGURE 3. The output of flip-flop circuit 33 corresponds to signals E with the exception that the presence of an error complements the flip-flop. It will be appreciated that this implies that the circuit 33 was in a "zero" state, and that after complementing it is placed in the "one" state, and vice versa. Thus, it will be seen that waveform F at bit positions 11, 12 and 18 is complemented in accordance with error pulses, subsequently described. This complementing is necessary in order to restore the flip-flop circuits 33 and 34 to their correct position after error detection. The output of the second flip-flop circuit 34 is a delayed replica of pulse train F, i.e., the output G, as shown in FIGURE 3, is delayed one bit interval from pulse train F of FIGURE 3. This output is fed back as one input of the EXCLUSIVE OR gate 31, and is also applied as one of the inputs to each of the error-sensing AND gates 26 and 28.

The present invention provides for the top and bottom slicers 23 and 24 of FIGURE 2 to produce particular combinations of outputs depending upon the signal level at the receiver 12, as applied to terminal 22 of FIGURE 2. Thus, if waveform C at terminal 22 is in the extreme upper level, the output of both the top and bottom slicers is binary 1. In the extreme bottom level of waveform C, the outputs of both slicers in binary 0. When the modified duobinary waveform at terminal 22 is in the center level, the top slicer 23 has an output of binary 0, and the bottom slicer 24 has an output of binary 1. The outputs of these top and bottom slicers are applied, as stated above, to inputs of the AND circuits 26 and 28, and there follows a consideration of the operation of these error-detecting AND circuits in accordance with the input signals, as previously identified.

Considering first the situation wherein no errors occur in transmission, it will be appreciated that AND circuit 26 receives at data bit 4, for example, a binary 1 signal from waveform G and a trigger pulse of waveform E. Inasmuch as the trigger pulse is inverted by inverter 32, there will be no input from waveform E. In this data slot, the waveform C is in the center level, so that there will be no output from the top slicer 23, and consequently the AND circuit 26 will produce no output signal. Insofar as the other error-detecting AND circuit 28 is concerned, the waveform G, which is binary 1, is inverted so as to produce no input signal; the clock pulse E is directly applied to the circuit, but the bottom slicer 24 produces a binary 1 signal which is inverted so that as a net result only a single input pulse is applied to the circuit 28 and no output pulse results therefrom. By this same reasoning, it can be determined that under all circumstances of correct transmission the AND circuits 26 and 28 will not operate the OR circuit 41.

Upon the occurrence of an error in transmission, this error is applied to both input terminals 21 and 22 of the error detection circuit, although in slightly different manner. The terminal 22 receives the modified duobinary signal, and in the instance wherein errors appear therein, such signal may comprise the waveform C of FIGURE 3. The input terminal 21 receives the reconstituted binary signal including these errors, and this is represented by waveform D of FIGURE 3. An error indication signal H from the error-indicating AND circuit 26 occurs only under the circumstances wherein the modified duobinary input signal C is in the top extreme level (corresponding to binary outputs 1 from both top and bottom slicers 23 and 24), and the output E of the EXCLUSIVE OR circuit 31 is 0 and the other G input to the AND circuit 26 is 1. Under these circumstances, it will be seen that the AND circuit 26 is supplied with an input signal from top slicer 23, an inverted zero signal or binary one signal from the EXCLUSIVE OR gate, and a binary one signal from the flip-flop circuit 34. The coincidence of these input signals thus produces the output signal H, indicative of an error, as occurs in bit space 9 and 10 of FIGURE 3. This error-indicating signal H is passed through the OR circuit 41 to the output terminal 42 and is also fed back through the line 43 to the flip-flop 33 so as to complement same, as indicated at bit spaces 11 and 12 of FIGURE 3. This is necessary in order to restore the flip-flop circuits to their correct positions after an error is indicated. In the instance wherein a double error occurs, it will be seen that double complementing also occurs. It will also be noted that the error indication is produced subsequent to the actual error occurrence. The other error-indicating AND circuit 28 is not operated to pass a signal under the foregoing circumstances, inasmuch as the bottom slicer output is binary 1 for the upper extreme level and is inhibited by 27.

In a similar manner, an error output signal I occurs when the EXCLUSIVE OR gate output E is 1, the waveform G is zero, and the bottom slicer output is zero indicating the bottom extreme level. The two types of errors, i.e., MARK to SPACE and SPACE to MARK are indicated in FIGURE 3, and in each instance it will be seen that the error-detection signal of FIGURE 2 produces an error indication signal which upon passage through the OR circuit 41 provides the composite error signal J at output terminal 42. The reasoning applied above in connection with the error occurring at time slots 9 and 10 is equally applicable to the error indicated at time slot 15 which produces the error signal I from the error-indicating AND circuit 28.

It will be seen from the foregoing description of the present invention that any errors that violate the rules of the Modified Duobinary System are detected. The advantages of error detection without the introduction of redundant, or extraneous digits, is believed to be apparent to those skilled in the art, and, clearly, the present invention does accomplish this objective.

Although the present invention has been described above in connection with a single preferred embodiment thereof, it is not intended to limit the invention to the exact terms of the description nor the details of illustration. Reference is made to the appended claims for a precise delineation of the true scope of this invention.

What is claimed is:

1. An error detection system for modified duobinary data transmission wherein each data bit is correlated with the second preceding bit comprising:
    (a) first means producing a signal for an extreme signal level of received modified duobinary signals;
    (b) second means producing a signal in the absence of a coincidence between extreme signal levels of decoded modified duobinary signals received and the second previous extreme signal level thereof; and
    (c) coincidence circuit means producing an error signal upon coincidence of the signals of (a), the absence of signal from (b), and the presence of an extreme level signal from said second previous extreme signal level of (b).

2. The error detection system of claim 1 further defined by said second means comprising:
    an EXCLUSIVE OR circuit having two inputs and an output with one input receiving said decoded modified duobinary signals;
    first and second flip-flop circuits connected in series from the output of said EXCLUSIVE OR circuit; and,
    means connecting the output of said second flip-flop circuit to the other input of said EXCLUSIVE OR circuit.

3. The error detection circuit of claim 2 further defined by means connecting the output of said coincidence circuit means to said first flip-flop circuit to reset same upon occurrence of an error signal.

4. The error detection circuit of claim 2 further defined by said first means comprising first and second slicers producing signals upon receipt of upper and lower level modified duobinary signals respectively; and,
    said coincidence circuit means comprising first and second AND circuits, said first AND circuit being connected to receive the output of said second flip-flop circuit and said first slicer as well as the inverted output of said EXCLUSIVE OR circuit, and said second AND circuit being connected to receive the output of said EXCLUSIVE OR circuit as well as the inverted output of said second flip-flop circuit and the inverted output of said second slicer.

5. The error detection circuit of claim 4 further defined by an OR circuit having a pair of inputs separately connected to the outputs of said first and second AND circuits and means connected from the output of the OR circuit to said first flip-flop circuit to reset same upon occurrence of an error signal.

6. A method of detecting errors in modified duobinary data transmission wherein each data bit is correlated with the second preceding data bit comprising the steps of:
    (a) producing separate signals from upper and lower extreme levels of a modified duobinary pulse train to be checked;
    (b) comparing each bit of a decoded version of the pulse train of step (a) with the second preceding bit to produce a signal in the absence of a coincidence of positive pulses;
    (c) producing an error indication signal from a coincidence of the first signal of step (a), the second preceding bit signal of step (b), and the inverse of the signals produced in step (b); and,
    (d) producing an error signal from a coincidence of the signals produced in step (b) and the inverse of the second signal of steps (a) and the inverse of the second preceding bit signal of step (b).

References Cited

UNITED STATES PATENTS

| 3,061,814 | 10/1962 | Crater | 340—146.1 |
| 3,303,462 | 2/1967 | Dotter | 340—146.1 |
| 3,278,898 | 10/1966 | Rumble | 340—146.1 |
| 3,337,864 | 8/1967 | Lender | 325—42 X |
| 3,343,125 | 9/1967 | Lender | 340—146.1 |

MALCOLM A. MORRISON, Primary Examiner

R. STEPHEN DILDINE, Jr., Assistant Examiner

U.S. Cl. X.R.

325—42